United States Patent [19]

Gronvall

[11] Patent Number: 4,998,894
[45] Date of Patent: Mar. 12, 1991

[54] COAXIAL CABLE CONNECTOR SEAL

[75] Inventor: Daniel Gronvall, Pleasanton, Calif.

[73] Assignee: Raychem Corporation, Menlo Park, Calif.

[21] Appl. No.: 254,336

[22] Filed: Oct. 6, 1988

[51] Int. Cl.[5] ............................................. H01R 13/52
[52] U.S. Cl. ................................. 439/521; 439/133; 439/936
[58] Field of Search .............. 174/76, 138 F; 439/199, 439/204, 271, 272, 273, 274, 275, 276, 277, 519, 521, 577, 578, 936, 133

[56] References Cited

U.S. PATENT DOCUMENTS

| | | | |
|---|---|---|---|
| 3,755,615 | 8/1973 | Paullus et al. | 439/936 X |
| 3,757,031 | 9/1973 | Izraeli | 174/138 F |
| 3,879,575 | 4/1975 | Dobbin et al. | 174/92 |
| 3,994,553 | 11/1976 | Kornick | 439/281 |
| 4,083,902 | 4/1978 | Clyde | 439/936 X |
| 4,600,261 | 7/1986 | Debbaut . | |
| 4,610,738 | 9/1986 | Jervis | 156/49 |
| 4,634,207 | 1/1987 | Debbaut . | |
| 4,643,924 | 2/1987 | Uken et al. | 428/35 |
| 4,674,813 | 6/1987 | Feldner | 439/133 |
| 4,678,260 | 7/1987 | Gallusser et al. | 439/320 |
| 4,690,831 | 9/1987 | Uken et al. | 427/44 |
| 4,702,710 | 10/1987 | Dittman et al. | 439/271 |
| 4,717,355 | 1/1988 | Mattis | 439/452 |
| 4,753,611 | 6/1988 | Kobler | 439/578 |
| 4,755,152 | 7/1988 | Elliot et al. | 439/275 X |
| 4,759,722 | 7/1988 | Song | 439/578 |
| 4,806,116 | 2/1989 | Ackerman | 439/578 X |
| 4,875,870 | 10/1989 | Hardy et al. | 439/936 X |

Primary Examiner—Neil Abrams
Assistant Examiner—Khiem Nguyen
Attorney, Agent, or Firm—A. Stephen Zavell; Herbert G. Burkard

[57] ABSTRACT

An environmental sealing connector housing which includes means for retaining the housing on the terminator and the connector both in the associated but unconnected state, and in the connected state is described and illustrated. More specifically, the sealing connector housing includes compartments within the housing which are sized to accept the tap port and connector combination as well as separate compartments which can retain the housing on the tap while providing a compartment for the connector when the connector is not connected to the tap. In addition, the housing is designed so that a 180° rotation of the housing permits the same housing to be used on both connected and unconnected connector/tap combinations to serve as a means of avoiding tampering with or stealing of the signal emanating from the tap.

16 Claims, 2 Drawing Sheets

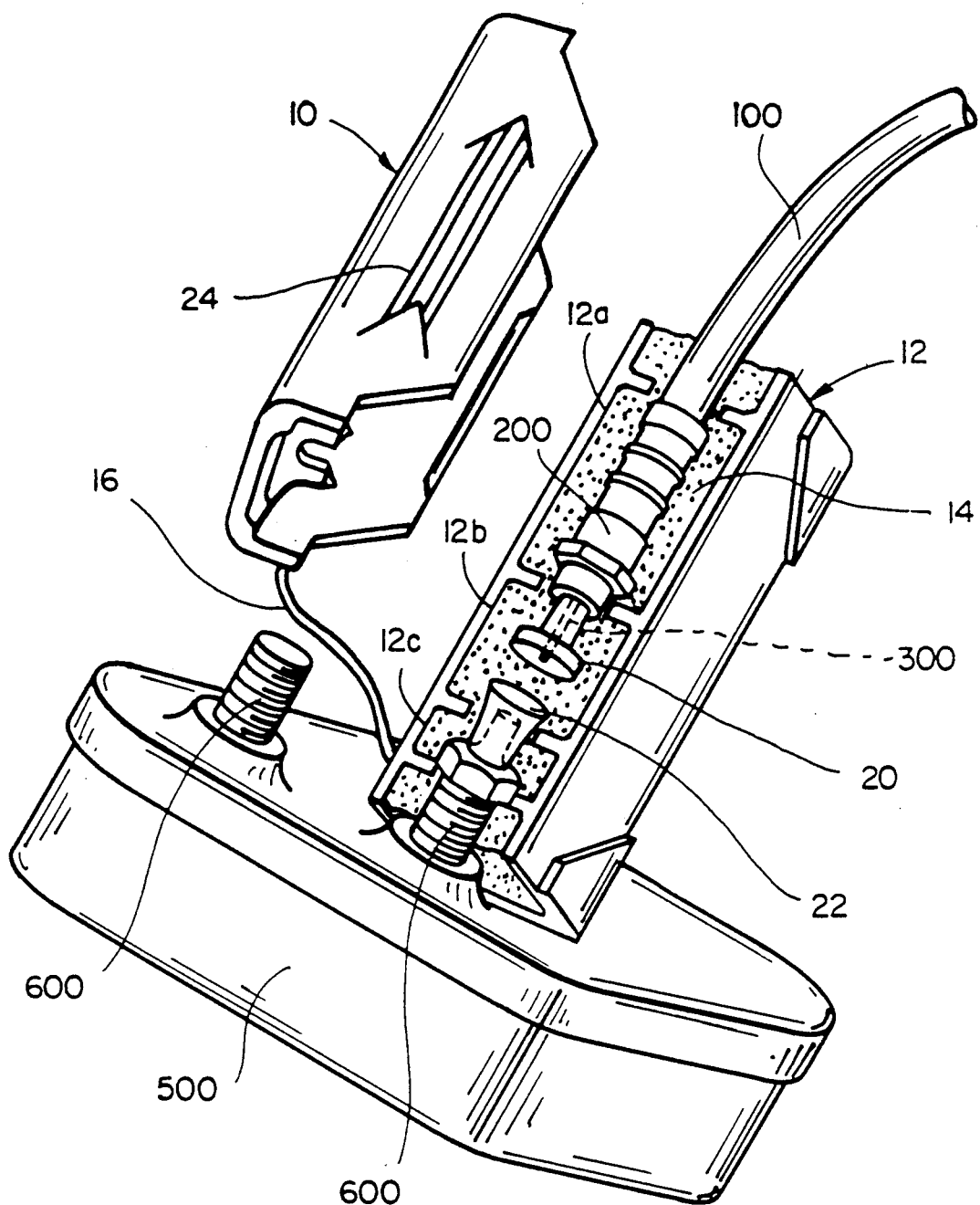
FIG_1

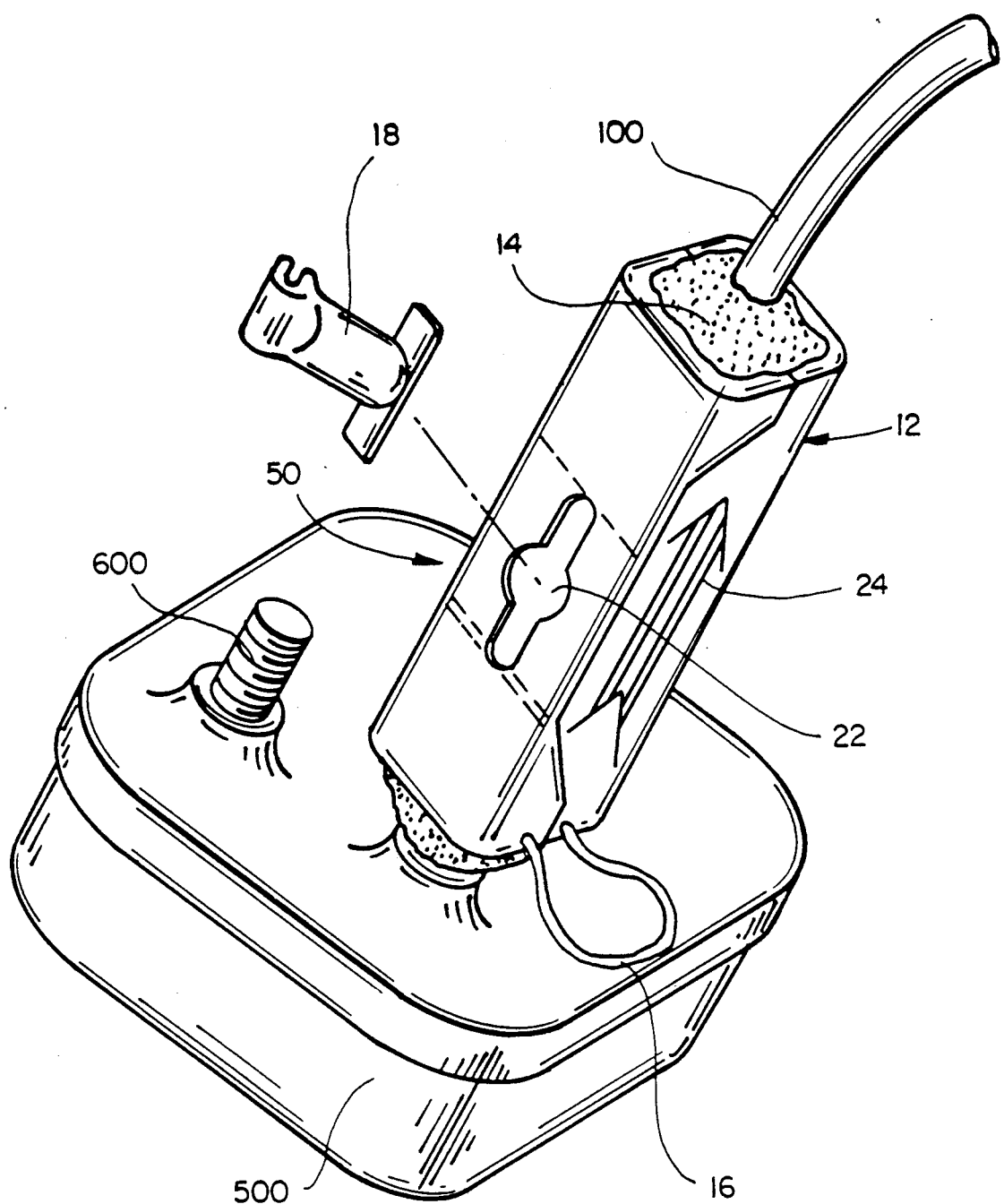
FIG_2

4,998,894

COAXIAL CABLE CONNECTOR SEAL

FIELD OF THE INVENTION

This inventon relates to radio frequency connector seals. More specifically, this invention relates to coaxial cable TV drop seals. In particular, this invention relates to a cable TV connector seal which can be installed around the terminator on the cable TV tap to environmentally protect the coaxial drop wire and the terminator.

BACKGROUND OF THE INVENTION

Radio frequency cable connectors and tap terminations exposed to outside elements degrade and corrode. The corrosion and degradation requires periodic maintenance to apply new cable connectors and new taps. Preventing this corrosion or extending the intervals between cable and terminator maintenance would save many man-hours and substantial amounts of money. Thus, it would be desirable to have a means of environmentally sealing and protecting the radio frequency source termination and the connector on the end of the cable.

Cable TV operators provide radio and TV programming for a fee. These operators loose millions of dollars of revenues each year because of theft by unauthorized users. Thus, it would also be desirable to have a means for securing the cable to the cable TV tap or other radio frequency source without permitting the explicit disclosure of whether or not the cable was in fact connected to the RF source.

Therefore, it is an object of this invention to provide environmental protection of a terminator of a radio frequency tap such as a cable TV tap and the connector on the end of a coaxial cable. It is a further object of this invention to provide a means for protecting the tap and the cable without permitting a person from knowing whether or not the cable was in fact connected.

SUMMARY OF THE INVENTION

The invention provides the desirable features recited and meets the objects previously annunciated and provides other features and objects which are readily apparent to the skilled artisan. The invention comprises a housing containing compartments or regions capable of containing the male and female portions of a connector both when mated together and in a disconnected association.

BRIEF DESCRIPTION OF THE DRAWINGS

FIG. 1 is an exploded view of the cable/terminator seal container of the invention.

FIG. 2 illustrates the seal of FIG. 1 installed.

DETAILED DESCRIPTION OF THE INVENTION

The invention will be more particularly described by referring to the preferred embodiments illustrated in FIGS. 1 and 2. FIG. 1 is an exploded view of the radio frequency connector container. Of course the concepts of the container are adaptable to any connector system. More specifically, the connector container 50 (FIG. 2) has a split body comprising a top member 10 and a base member 12 for surrounding and encasing the cable connector 200 on cable 100 to a radio frequency source 500 which is a cable TV tap herein having a radio frequency terminator source 600. Although the container body is described with two parts, it can comprise any number of parts. Optionally, the parts can be hinged together as a unitary piece. A portion of the base 12 has compartments 12a, 12b, and 12c. The compartment 12a is sized so that it accommodates the connector 200 when it is attached to the terminator 600. The compartment 12c is sized to fit around and attach to the terminator 600 to prevent its removal therefrom when the terminator 600 is not mated to the connector 200. Between compartments 12a and 12c is a compartment 12b which permits an insertion of an optional metal radio frequency shield cap 22 on terminator 600. A suitable shield is taught in U.S. Pat. No. 4,717,355, incorporated herein by reference for all purposes. Additionally, the connector 200 can have an end protector 20 such as a plastic end connector capable of mating thereto to prevent damage to the fragile central copper core conductor in the coaxial cable and aid its retention in the compartment. The copper core is illustrated as 300.

To prevent corrosion of the terminator 600 and the connector 200, compartments 12a, 12b, and 12c are filled with a suitable environmental sealing material such as a gel of a silicone, Krayton, or urethane material or mixtures thereof. gel. Preferably the gels have a core penetration of from about 50 to 350 ($10^{-1}$ mm) and an ultimate elongation of at least about 100% and preferably greater than 200%. Examples of suitable gels are taught in U.S. Pat. Nos. 4,600,261; 4,634,207; 4,643,924; and 4,690,831, each of said patent incorporated herein by reference for all purposes. The gel is initially poured into compartment 12a, 12b, and 12c in a liquid state and permitted to cure. Any sealing material capable of removably and reusably adhering to the terminator 600 and connector 200 is suitable for use in the invention. The connector container 50 maintains the gel under compression for the best sealing of the terminator 600 and connector 200.

An optional feature to preclude the container from being lost is a tether 16 to hold parts 10 and 12 together when 10 is removed from 12. A further option is an indicator means 24 such as an arrow, as illustrated, to show the status of the terminator 600/connector 200 relationship. As illustrated in FIG. 1 the cable 100 with connector 200 is maintained in compartment 12a by the sizing thereof and optionally the protector 20. When the subscriber pays for the TV service or the cable is connected a terminator at a radio frequency signal source, the housing 10 and 12 is rotated 180° to permit the connector 200/tap 600 combination to fit within compartment 12a.

An additional optional feature is a locking mechanism 22 opened by a key 18 through the opening, as illustrated in FIG. 2 containing the locking means 22. The key means 18 engages or releases locking teeth which hold housing parts 10 and 12 together. In addition, the key means forms a handle to facilitate the separation of the top member of the housing 10 from the base member 12. As illustrated in FIG. 1, the radio frequency seal is in the nonconnected position as installed in view of the direction of arrow 24. Assuming that the cable 100 was connected to the terminator 600 through connector 200 then the arrow 24 would face in the opposite direction. Because the cable is securely held to the tap 500 either through the connector and the terminator, or by the housing when separated, unauthorized personnel are not inclined to tamper with the seal nor know whether or not the cable 100 is connected to the tap 500 through the terminator 600 and connector 200.

Although the invention has been described with respect to particularly perferred embodiments, modifications obvious to one of ordinary skill in the art are contemplated to be within the scope of the invention. For example, the sealing device can be used or adapted for any wire connector/terminator connection where environmental sealing and security are desired.

I claim:

1. A cable connector housing for surrounding and sealing the male and female portions of respective coaxial cable connectors or a coaxial connector to a radio frequency source, said housing comprising:
   a base member and a top member capable of fitting together to form a surrounding housing for the male and female portions of a connector or a connector and a radio frequency source; and
   compartment means defined by separation members within said base member for accepting the male and female portions both in the male to female connected position and in the nonconnected position where the male and female portions are disconnected but still sealed within the housing and are located in different compartments; and
   environmental sealing means contained within each of the compartments.

2. The apparatus according to claim 1 wherein the environmental sealing means is a gel maintained under compression by the housing when the housing base member and top member are together, said gel having a cone penetration of from about 50 to 350 ($10^{-1}$ mm) and an ultimate elongation of at least about 100%.

3. The apparatus according to claim 2 further comprising indicator means to indicate whether or not the termination connector and termination source are connected.

4. The apparatus according to claim 2 wherein the base member and top member are hinged together.

5. The apparatus according to claim 2 further comprising locking means for locking the housing around the terminator source and the cable termination connector.

6. The apparatus according to claim 5 further comprising tethering means to maintain the base member in association with the top member.

7. The apparatus according to claim 6 further comprising a conductive cap for the terminator source.

8. The apparatus according to claim 7 further comprising a shield for the conductive core of a cable.

9. The apparatus according to claim 1 wherein the compartment means are different sized compartments.

10. A kit of parts for environmentally protecting the male and female portions of a connector or a radio frequency source terminator and a coaxial cable connector comprising:
    a housing consisting of at least two or a plurality of parts having regions therein defined by separation members capable of containing the male and female portions of the terminator and the connector wherein one of the regions can contain the terminator and the connector in the connected form and a different one of said regions to contain the terminator when disconnected from the connector; and
    environmental sealing means contained within each of the regions within the housing.

11. The kit according to claim 10 further comprising locking means for locking the housing and a key to lock and unlock the locking means.

12. The kit according to claim 11 wherein the housing comprises a base member and a top member.

13. The kit according to claim 12 wherein the base and top members are associated together.

14. The kit according to claim 13 wherein the base and top member are hinged together.

15. The kit according to claim 14 wherein the environmental sealing means is a gel maintained under compression within the housing, the gel having a cone penetration of from about 50 to 350 ($10^{-1}$ mm) and an and an ultimate elongation of at least about 100%.

16. The kit according to claim 10 wherein the plurality of regions are different sized regions.

* * * * *

UNITED STATES PATENT AND TRADEMARK OFFICE

CERTIFICATE OF CORRECTION

PATENT NO.     : 4,998,894

INVENTOR(S)   : Daniel Gronvall

DATED           : March 12, 1991

It is certified that error appears in the above-identified patent and that said Letters Patent is hereby corrected as shown below:

```
     Column 1, line 38 replace "without permitting a person from
knowing" by--without permitting a person to know--.
     Column 2, line 24 replace "Krayton" by--Kraton--.
Column 2, line 25 delete "gel".
     Column 2, line 30 replace "patent" by --patents is--.
     Column 2, line 32 replace "compartment" by--compartments--.
     Column 2, lines 47 to 48 after "connected" insert--to--.

Claim 15, line 4 (Column 4, line 38) delete the first
occurrence of "and an".
```

Signed and Sealed this

Twenty-eight Day of March, 1995

Attest:

BRUCE LEHMAN

Attesting Officer

Commissioner of Patents and Trademarks